US005192124A

United States Patent [19]

Kawashima et al.

[11] Patent Number: 5,192,124

[45] Date of Patent: Mar. 9, 1993

[54] REFLECTOR FOR VEHICLE HEADLIGHT

[75] Inventors: Hiroshi Kawashima; Takao Watanabe; Akira Miura, all of Shizuoka, Japan

[73] Assignee: Koito Manufacturing Co., Ltd., Tokyo, Japan

[21] Appl. No.: 783,992

[22] Filed: Oct. 29, 1991

[30] Foreign Application Priority Data

Jan. 23, 1991 [JP] Japan ................................ 3-021430

[51] Int. Cl.$^5$ ............................................ B60Q 1/04

[52] U.S. Cl. ...................................... 362/61; 362/297; 362/346

[58] Field of Search .................. 362/61, 80, 297, 304, 362/346, 347, 348, 309

[56] References Cited

U.S. PATENT DOCUMENTS 4,481,563 11/1984 Snyder et al. .
4,530,042 7/1985 Cibie et al. .
4,612,608 9/1986 Peitz .
4,697,225 9/1987 Lindae et al. ....................... 362/309
4,772,988 9/1988 Brun .
4,841,423 6/1989 Luciani .............................. 362/297
4,945,454 7/1990 Bunse et al. .
5,086,376 2/1992 Bisseau ............................... 362/297

FOREIGN PATENT DOCUMENTS 2597575 10/1987 European Pat. Off. .
0373065 6/1990 European Pat. Off. .

*Primary Examiner*—Richard R. Cole
*Attorney, Agent, or Firm*—Sughrue, Mion, Zinn, Macpeak & Seas

[57] ABSTRACT

An elliptical paraboloid, which is a basic surface, has an elliptical section when it is cut by a plane perpendicular to its optical axis, and has a parabolic section when it is cut by a plane including its optical axis. A light source is arranged on the optical axis. A cross sectional curve obtained when a reflecting surface is cut by a plane perpendicular to its optical axis is expressed by a finite-order vector algebraic expression by specifying its end point positions and coefficient vectors. As a result, the reflecting surface is formed as a free surface deviating from the basic surface. Operations for controlling the surface, which are important in forming a cutline, are an operation of making the tangential vector at the end point of the cross sectional curve orthogonal to the position vector, and an operation of twisting the surface. By these operations the light-distribution control is performed so that longitudinally extending peripheries of respective filament images can be flush with one another. Finally, a sharp cutline is formed which is specific to a low beam.

20 Claims, 14 Drawing Sheets

REFLECTOR FOR VEHICLE HEADLIGHT

BACKGROUND OF THE INVENTION

1. Field of the Invention

The present invention generally concerns the control of a reflected light beam by the shape of a reflecting surface and is applicable to various optical fields with particular relevance to lighting equipment. The invention is important to vehicle headlights and, in particular, reflectors therefor which are capable of producing a low intensity beam having a sharp cutline while using its entire reflecting surface. The invention is especially applicable to headlights for streamlined automobiles.

2. Description of the Related Art

FIG. 25 is a diagram showing the basic construction of a low beam headlight for an automobile. A coil-like filament c is disposed adjacent to the focal point b of a paraboloid-of-revolution reflector a such that the central axis of the filament c extends along the optical axis of the reflector a (so-called C-8 type filament arrangement). Below the filament c is a shade d that serves to form a cutline (or cutoff) in a light-distribution pattern. A sharp cutline is desirable for an automobile headlamp because it permits accurate adjustment of the lamp so that there is illumination of the road ahead of the vehicle by light from below the cutline but there is no illumination above the cutline that may "dazzle" oncoming vehicles.

As is understood from the figure, since part of light emitted from the filament c is shielded by the shade d, no light reaches a surface $a_L$ (indicated by hatching) which occupies almost the entire lower half of the reflecting surface of the reflector a. That is, such part of the light is cut by the shade d, and is not utilized. As a result, the utilization rate of the luminous flux from the lamp is reduced.

Hence, a pattern f projected on a screen e that is disposed in front of the reflector a at a predetermined distance away therefrom is formed into an almost semicircular pattern, in which one part g of its cutline forms a predetermined angle (15°) relative to a horizontal line (this line is indicated by "H—H", the vertical line is indicated by "V—V", and their intersection is indicated by "HV"), and the other part h of the cutline extends in parallel with and below the horizontal line H—H.

If the emitted light pattern is further subjected to light-distribution control by diffusion lens steps of an outer lens (not shown) disposed ahead of the reflector a, the low beam distribution pattern is formed into a pattern i, as shown in FIG. 26, which is elongated in the horizontal direction.

The headlamp design of FIGS. 25 and 26 are not suitable for modern styling requirements. In recent years, the bodies of automobiles have become "streamlined" in order to satisfy the demand for sleek styling as well as efficient aerodynamic characteristics and design. As a result, it is required that headlights be designed to match the so-called "slant-nosed" front part of the body. In response to such a requirement, often headlights are designed so that they are horizontally narrower (i.e., the vertical height of a headlight is decreased), and that they have a larger slant (i.e., a so-called slant angle, formed between the outer lens and the vertical axis, is increased).

If the vertical height of the reflector is decreased and if the outer lens is largely inclined, then the outer lens should no longer be provided with wide diffusion lens steps. If such steps are still used, the so-called "light tailing" phenomenon may be observed in which the right and left end portions of a light-distribution pattern have a gentle slope. These requirements impose major design restrictions.

To overcome this problem, it has been suggested that the light-distribution control function conventionally assumed by the outer lens should be undertaken by the reflector. To cope with the narrowing of the lamp height, it is desirable to remove a shade to prevent a reduction in luminous flux utilization rate, and to fully use the entire surface of the reflector.

A variety of reflectors having such a light-distribution control function have been proposed. One example is a reflector j whose reflecting surface k is divided into two paraboloid-of-revolution reflecting regions $k_H$, $k_L$ that substantially occupy the upper and lower halves, respectively, as shown in FIG. 27(*a*). And as shown in FIG. 27(*b*), the rear end of a filament c is positioned at a point displaced ahead by $\alpha$ (i.e., in the direction of leaving from the reflector) from the focal point F of the upper reflecting region $k_H$, while the front end of the filament c is positioned at a point displaced behind by $\beta$ from the focal point $F_2$ of the lower reflecting region $k_L$. Both focal points are on the optical axis $+X-X$ of the reflector j.

In this case, a composite pattern m to be projected by the reflector j on a distant screen, as shown in FIG. 28, is formed into a shape in which a pattern n (indicated by the solid line) formed by the upper reflecting region $k_H$ and a pattern o (indicated by the one dot chain line) formed by the lower reflecting region $k_L$ are combined. As is understood from FIG. 28, the "cutline" of the pattern m is formed by the upper edge of the pattern n.

In the aforesaid reflector j, its entire surface is utilized. However, the quantity of light in regions A, A adjacent to the cutline is relatively small compared with that in region B where the patterns n and o overlap. Accordingly, the distribution of light is not uniform and the brightness of the projected light gradually changes (is reduced) as the position nears the cutline. As a result, it is difficult to form a sharp cutline.

To overcome this shortcoming, two small shades p, p may be disposed around the light source as shown in FIG. 29 so that a sharp cutline can be obtained. However, the design of such a mounting structure, etc., as to ensure positional accuracy of the shades p, p, is difficult. Further, since light beams toward the boundaries between the reflecting regions $k_H$ and $k_L$ (indicated by hatching) are shielded by the shades p, p, the effective use of the reflecting surface is not fully achieved, thus making this technique not the best solution but rather a compromise.

SUMMARY OF THE INVENTION

To overcome the above problems, the invention is applied to a reflector for a vehicle headlight to obtain a light-distribution pattern having a cutline specific to a low beam, which reflector has a basic surface of an elliptical paraboloid that has an elliptical section when cut by a plane perpendicular to its optical axis and a parabolic section when cut by a plane including the optical axis. A light source is arranged such that its central axis extends along the optical axis. In such a reflector, the configuration of a sectional curve obtained when cut by a plane perpendicular to the optical axis is expressed by a finite-order vector algebraic expression by specifying its start point and end point and a plurality of coefficient vectors between both points. As a result, a new design freedom is obtained for the configuration of the curve, allowing a surface deviating from the basic surface to be obtained freely. With respect to the new design freedom, an operation of making a tangential vector at a terminal point of the sectional curve to be orthogonal to a position vector of the terminal point and an operation of twisting the surface by specifying the coefficient vectors have an important optical meaning in forming a cutline in the light-distribution pattern.

According to the invention, design freedom is obtained which is necessary for arbitrarily modifying the basic surface to obtain a desired configuration of the reflecting surface. Therefore, the entire reflecting surface can be provided with a desired light-distribution control function. In particular, with respect to the reflecting regions contributing to the formation of a cutline, the operation of applying the orthogonal condition to the relationship between the tangential vector and position vector at the start point and end point of the sectional curve that is obtained when the reflecting surface is cut by a plane perpendicular to its optical axis, and the operation of twisting the original surface by applying vector control are important in optical terms. The former operation serves to cause the longitudinal central axes of respective filament images projected onto a plane in front of the reflecting surface to coincide with one another, and to arrange the respective filament images in parallel with the cutline. The latter operation serves to cause longitudinally extending edges of the respective filament images to be flush with one another, and to thereby form a cutline. These operations provide a sharply edged cutline.

DESCRIPTION OF THE PREFERRED EMBODIMENTS

Figure 1:
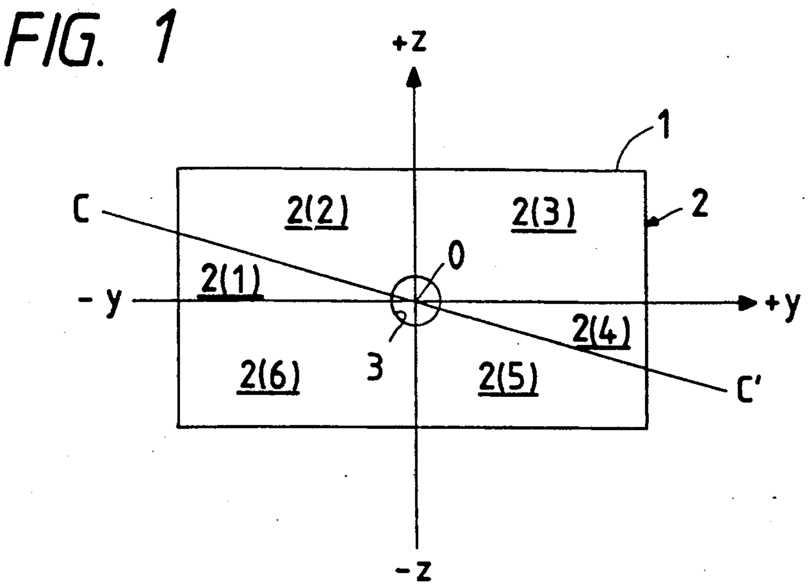
FIG. 1 is a front view illustrating light-distribution control blocks of a reflecting surface according to the present invention.

A reflector and headlamp of the present invention is intended to obtain a sharp cutline particular to low beams by utilizing the reflector's entire reflecting surface. FIG. 1 shows light-distribution control regions of the reflecting surface 2 of the reflector 1 in accordance with a preferred embodiment of the invention.

The reflecting surface 2 is divided int six regions 2(1), 2(2), 2(3), 2(4), 2(5) and 2(6) by three virtual planes when viewed from the front (i.e., when viewed from the optical axis, assuming that the optical axis is the "x-axis" which is normal to the sheet surface of FIG. 1). The three planes are: a first (x-y) plane including the x-axis and a horizontally extending axis passing through the center of the reflecting surface (this axis is referred to as "y-axis"); a second plane C-C' that is inclined with respect to the first plane by a predetermined angle around the x-axis; and a third (x-z) plane including the x-axis and a vertically extending axis passing through the center of the reflecting surface (this axis is referred to as "z-axis").

At the center of the reflecting surface 2 is a circular hole 3 which is formed around the origin O of the above orthogonal coordinate system as a mounting hole for a light bulb.

Figure 2:
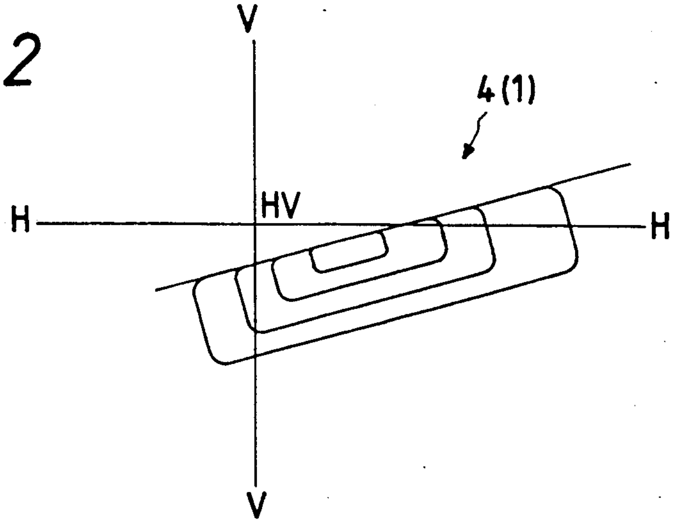
FIG. 2 is a diagram showing a pattern obtained by a reflecting region 2(1) in FIG. 1.
Figure 3:
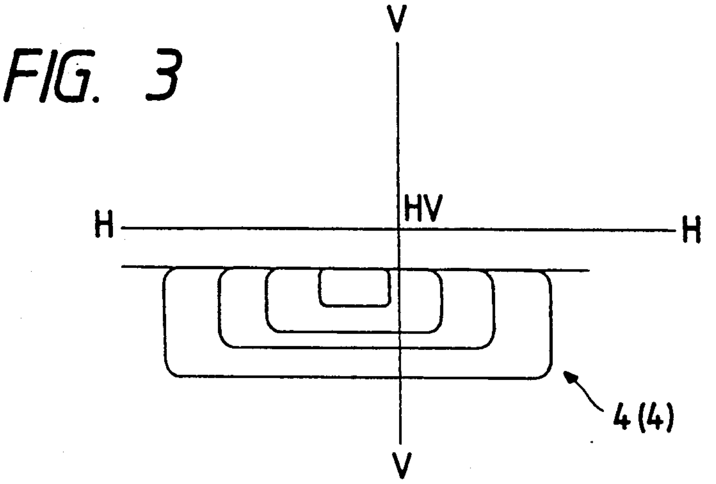
FIG. 3 is a diagram showing a pattern obtained by a reflecting region 2(4) in FIG. 1.

The two regions 2(1), 2(4), each including a section obtained when the reflecting surface 2 is cut by the x-y plane, are arranged symmetrically relative to the origin O. These regions contribute to forming a cutline in a light-distribution pattern. That is, the region 2(1) forms a cutline having a predetermined cutline angle relative to the horizontal line, and provides a pattern 4(1) shown in FIG. 2. The other region 2(4) forms a cutline that is parallel to and immediately below the horizontal line H—H as shown in FIG. 3, and provides a pattern 4(4). Common to these patterns is the fact that when light from a filament 5 (see FIG. 9) extending along the optical axis is projected on a screen in front thereof by the regions 2(1), 2(4), the upper edges of the respective filament images are arranged so as to coincide with the cutline. That is, the cutline is formed by the upper edges of the filament images that are flush with a straight line (the reason for such arrangement will be described later in detail).

Figure 4:
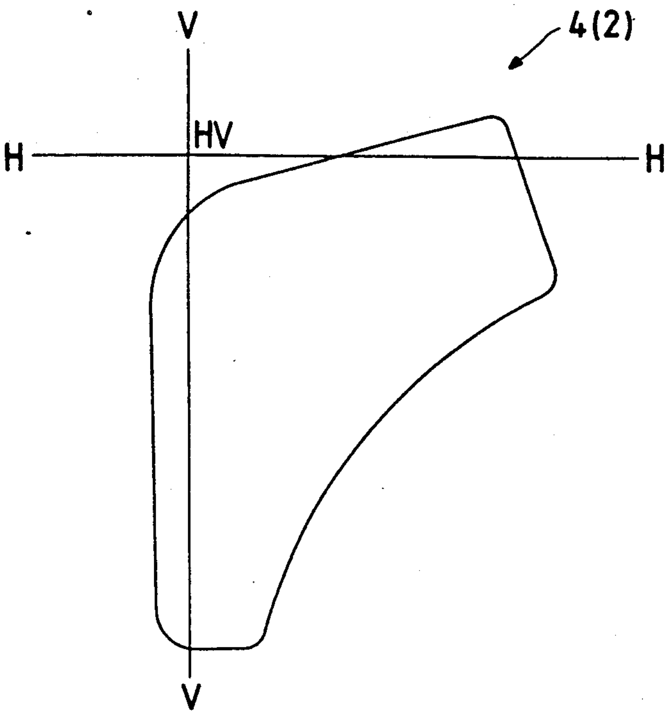
FIG. 4 is a diagram showing a pattern obtained by a reflecting region 2(2) in FIG. 1.
Figure 5:
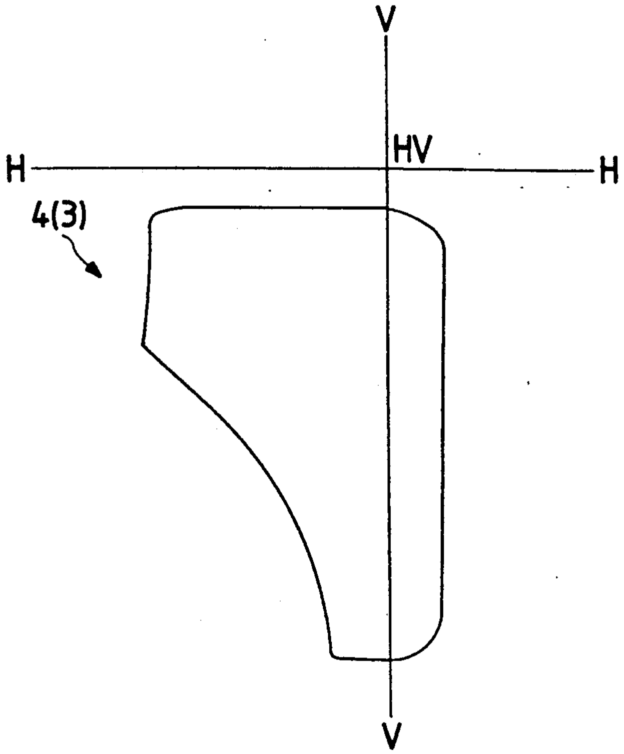
FIG. 5 is a diagram showing a pattern obtained by a reflecting region 2(3) in FIG. 1.

The portion excluding the region 2(1) in the upper half of the reflecting surface 2 (the region where $z>0$) is divided into two regions 2(2), 2(3) by the x-z plane. That is, a pattern 4(2) obtained by the region 2(2) at the left ($y<0$) of the z-axis becomes a pattern that is located substantially on the right side of a vertical line V—V and below the horizontal line H—H as shown in FIG. 4. And a pattern 4(3) obtained by the region 2(3) at the right ($y>0$) of the z-axis becomes a pattern that is located substantially on the left side of the vertical line V—V and below the horizontal line H—H as shown in FIG. 5.

Figure 6:
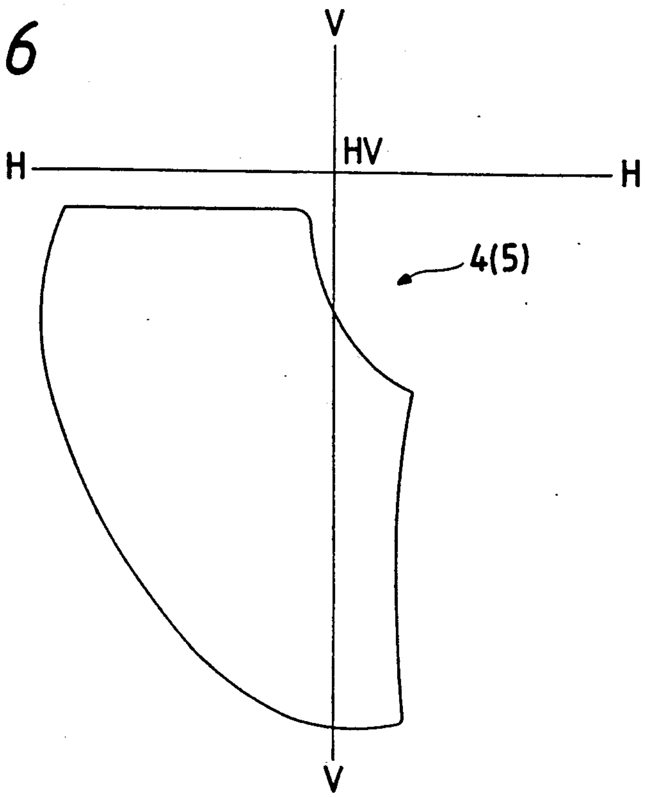
FIG. 6 is a diagram showing a pattern obtained by a reflecting region 2(5) in FIG. 1.
Figure 7:
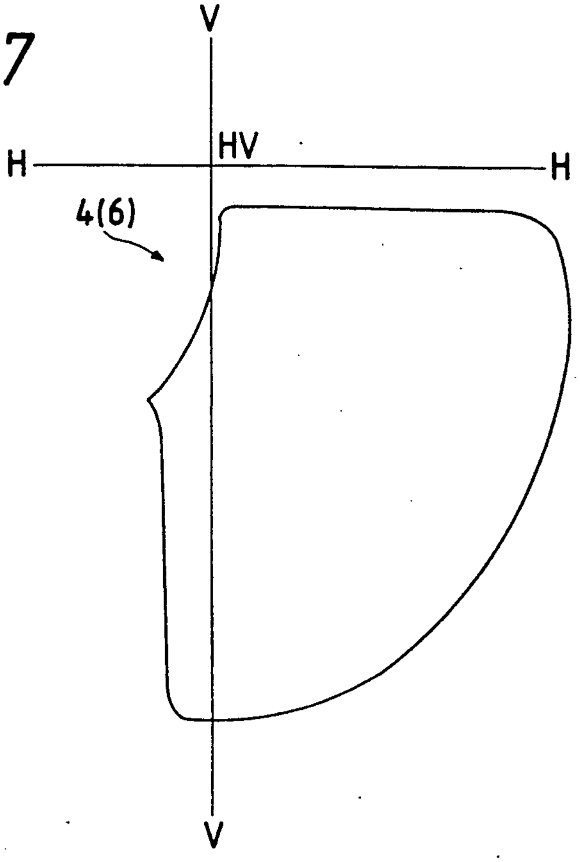
FIG. 7 is a diagram showing a pattern obtained by a reflecting region 2(6) in FIG. 1.

The portion excluding the region 2(4) in the lower half of the reflecting surface 2 (the region where $z<0$) is divided into the two regions 2(5), 2(6) by the x-z plane. That is, a pattern 4(5) obtained by the region 2(5) at the right ($y>0$) of the z-axis becomes an almost quarter circular pattern that is located substantially on the left side of the vertical line V—V and below the horizontal line H—H as shown in FIG. 6. And a pattern 4(6) obtained by the region 2(6) at the left of the z-axis becomes a pattern that is located substantially on the right side of the vertical line V—V and below the horizontal line H—H as shown in FIG. 7.

Figure 8:
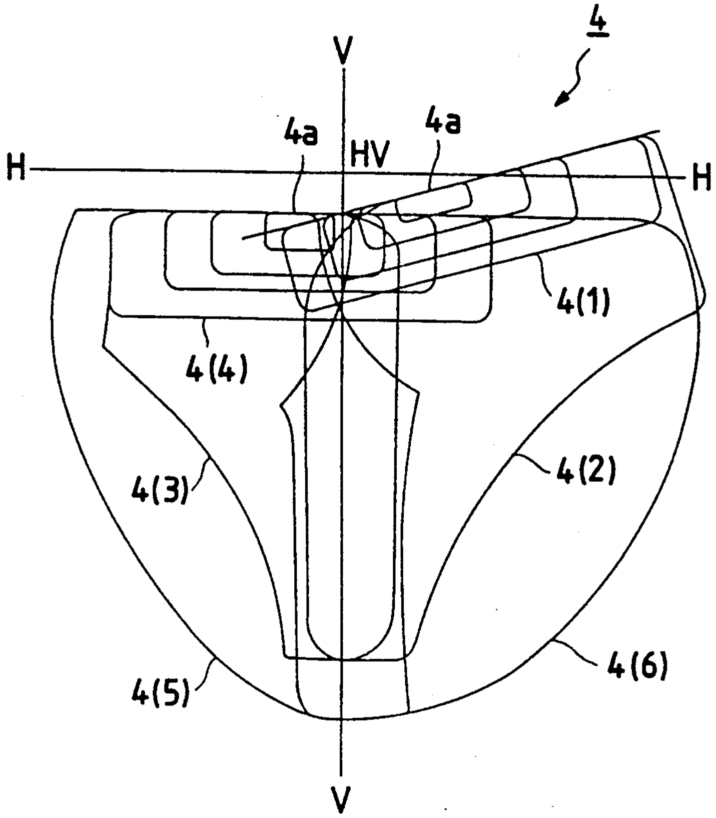
FIG. 8 is a diagram showing a whole pattern obtained by the reflecting surface of the invention.

The above patterns are combined into a whole pattern image 4 as shown in FIG. 8, from which it is understood that almost all the light-distribution pattern having a sharp cutline **4*a*** is formed only by the configuration of the reflecting surface 2.

Figure 9:
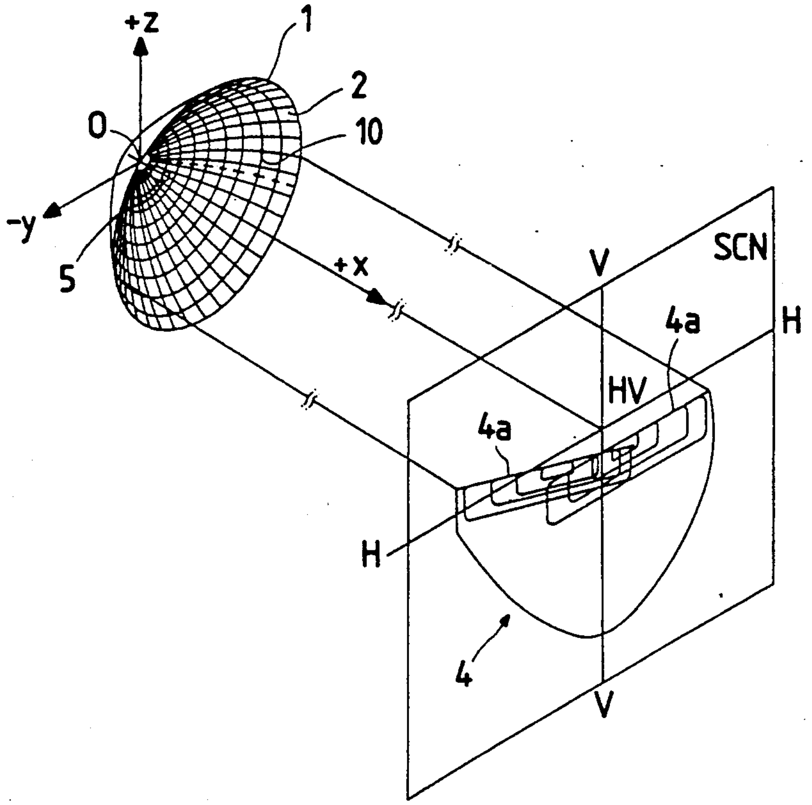
FIG. 9 is a schematic perspective view showing the reflecting surface of the invention together with a pattern obtained by the reflecting surface.

FIG. 9 is a perspective view conceptually showing the correspondence between the reflecting surface and the pattern image. The filament 5 that is shown as being cylindrical for simplicity is arranged so that its central axis extends along the optical axis (x-axis), and the whole pattern image 4 is obtained as a collection of the filament images projected on a distant screen (hereinafter referred to as "SCN") by the respective regions of the reflecting surface. In FIG. 9, the reflecting surface has a substantially circular configuration when viewed from the front, and seems to be different from the rectangular configuration shown in FIG. 1. This is because the designing of the reflecting surface starts from a reflecting surface as shown in FIG. 9, and then the actually used reflecting regions are cut out therefrom. Thus, there is no substantial difference between the two configurations in achieving the desired result.

Of further significance is the fact that each of the aforesaid six reflecting regions is formed with an elliptical paraboloid as a basic surface. This technique permits a significant freedom of design to be exercised since the configurational parameters may be adjusted while applying vector control for each portion of each region. The surface produced with such a high degree of design freedom is hereinafter referred to as a "free surface". In FIG. 1, the boundary between the adjacent regions are indicated by a line for convenience. However, since the continuity of the boundaries is assured, the boundary lines are not easily discernible by human eyes. If the boundary is not continuous and if discontinuity becomes noticeable, glare will disadvantageously be caused.

Equations expressing the configuration of a free surface will be described quantitatively below.

A free surface is based on an elliptical paraboloid (basic surface), and is generalized by approximating the basic surface into a (b 2×3)th order surface and applying vector control to the approximated surface. Although, in this embodiment, a curve obtained when a free surface is cut by a plane orthogonal to the x-axis is approximated as a cubic polynomial, the expression is not limited thereto. Of course, the curve may generally be in the form of an nth-order vector algebraic expression.

A partial surface of an elliptical paraboloid can be expressed as:

$$
\begin{aligned}
&r^2 = 4fx \quad (r_1 < 1 = r \leqq r_2) \\
&y = r a_y \cos\theta \\
&z = r a_z \sin\theta \quad (\theta_1 \leqq \theta \leqq \theta_2)
\end{aligned}
\tag{1}
$$

by using a radial parameter r relative to the x-axis and an angular parameter $\theta$ around the x-axis. In Formulae 1, "f" is a focal length, and $a_y$, $a_z$ are configurational parameters related to the y- and z-axes, respectively, and defining the shape of an ellipse. Further, $r_1 \leqq r \leqq r_2$ and $\theta_1 \leqq \theta \leqq \theta_2$ in parentheses represent the variation ranges of the parameters r and $\theta$, and the subscript "$_1$" means a start point, while the subscript "$_2$" means an end point.

Elimination of the parameters r and $\theta$ from Formulae 1 produces an equation indicating the relationship among x, y and z. It is understood that a cross section cut by a plane whose x-coordinate is constant is elliptical, and that a cross section cut by a plane including the x-axis is parabolic.

To obtain a parametric expression of Formulae 1, the parameter r is replaced by t. Also, unit vectors $\vec{i}$, $\vec{j}$ and $\vec{k}$ in the x-, y- and z-axis directions, respectively, are introduced to express a position vector for a point on the elliptical paraboloid (the position vector being designated by $\vec{P}$, which is a function of the parameters $\theta$ and t) in a vector representation as shown in the following Formula 2:

$$\vec{P}(\theta, t) = \frac{t^2}{4f} \cdot \vec{i} + t \cdot (a_y \cos\theta \cdot \vec{j} + a_z \sin\theta \cdot \vec{k}) \tag{2}$$

Figure 10A:
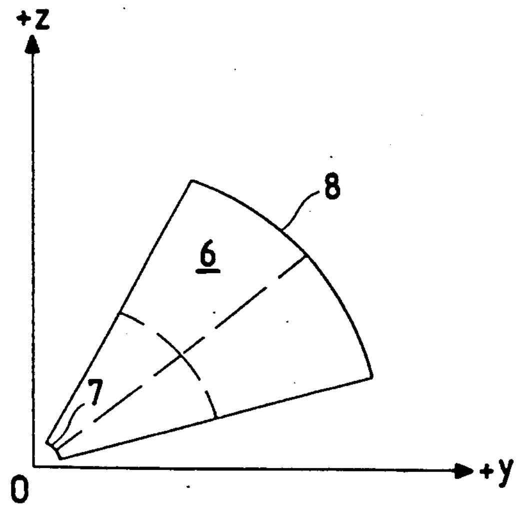
FIG. 10(*a*) is a y-z diagram showing the configuration of an elliptical paraboloid, and FIG. 10(*b*) is an x-z diagram showing the configuration of the elliptical paraboloid.
Figure 10B:
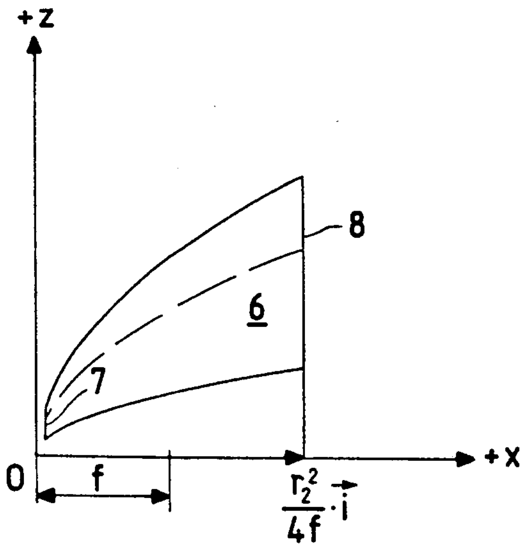

FIGS. **10(*a*) and 10(*b*) show the configuration of an exemplary elliptical paraboloid 6 expressed by Formula 2. FIG. 10(*a*) is a y-z diagram, while FIG. 10(*b*) is an x-z diagram. The first term on the right side of Formula 2 represents a point (its coordinate$=t^2/4f$) on the x-axis, while the second term on the right side represents a cross section (a part of an ellipse) when the elliptical paraboloid 6 is cut by a plane of $x=t^2/4f$. An elliptical arc 7 shown in FIGS. 10**(*a*) and 10(*b*) represents a cross sectional line when the elliptical paraboloid 6 is cut by a plane of $x=r_1^2/4f$, while an elliptical arc 8 represents a cross sectional line when the elliptical paraboloid 6 is cut by a plane of $x=r_2^2/4f$.

Next, the aforesaid elliptical paraboloid is approximated to a surface of (2×3)th order. The coefficient of the unit vector $\vec{i}$ in the first term on the right side of Formula 2 is a quadratic expression of t. The contents in parentheses of the second term may be approximated by a cubic polynomial of a parameter u as shown in the following Formula 3:

$$\alpha_y\cos\theta\cdot\vec{j}+\alpha_z\sin\theta\cdot\vec{k}\approx\vec{a}_0+\vec{a}_1\cdot u+\vec{a}_2\cdot u^2+\vec{a}_3\cdot u^3=\vec{f}(u) \quad (3)$$

Then, the elliptical paraboloid 6 can be expressed by a (2×3)th vector representation, which is the basic equation of a free surface, as shown in Formula 4:

$$\vec{F}(\theta,t)\approx\vec{F}(u,t)=\frac{t^2}{4f}\cdot\vec{i}+t\cdot\vec{f}(u) \quad (4)$$

Vectors $\vec{a}_0$, $\vec{a}_1$, $\vec{a}_2$ and $\vec{a}_3$ in Formula 3 are coefficient vectors that are determined by position vectors and tangential vectors for the start and end points of a curve, which can be calculated by equations to be described later.

Comparing Formula 1 with Formula 4, an elliptical paraboloid represented by Formula 1 is defined by three parameters f, $\alpha_y$ and $\alpha_z$, while a free surface represented by Formula 4 is given a new freedom by controlling the tangential vectors for an ellipse and applying the coefficient vectors $\vec{a}_0$, $\vec{a}_1$, $\vec{a}_2$ and $\vec{a}_3$, thus allowing a variety of modified surfaces to be produced in addition to simple approximation of an elliptical paraboloid.

When a parameter v, which is a normalized parameter for t, is introduced and defined by the following equation:

$$t=R\cdot v+r_1 \text{ provided that } R=r_2-r_1 \quad (5)$$

the variable range of t, $r_1\leq t\leq r_2$, corresponds to that of v, $0\leq v\leq 1$.

Substituting Formula 5 into Formula 4, a vector function $\vec{F}(u,v)$ of the parameters u, v is obtained as shown in the following equation:

$$\vec{F}(\theta,v)\approx\vec{F}(u,v)=\frac{(R\cdot v+r_1)^2}{4f}\cdot\vec{i}+(R\cdot v+r_1)\cdot\vec{f}(u) \quad (6)$$

As is understood from Formula 3, the vector function $\vec{f}(u)$ represents a curve on a surface where x is constant and there is no x-axis component (i.e., i component). It will be explained next how the coefficient vectors $\vec{a}_0$ to $\vec{a}_3$ of the function $\vec{f}(u)$ are determined when a start point, an end point, and tangential vectors at the start and end points are given.

Figure 11:
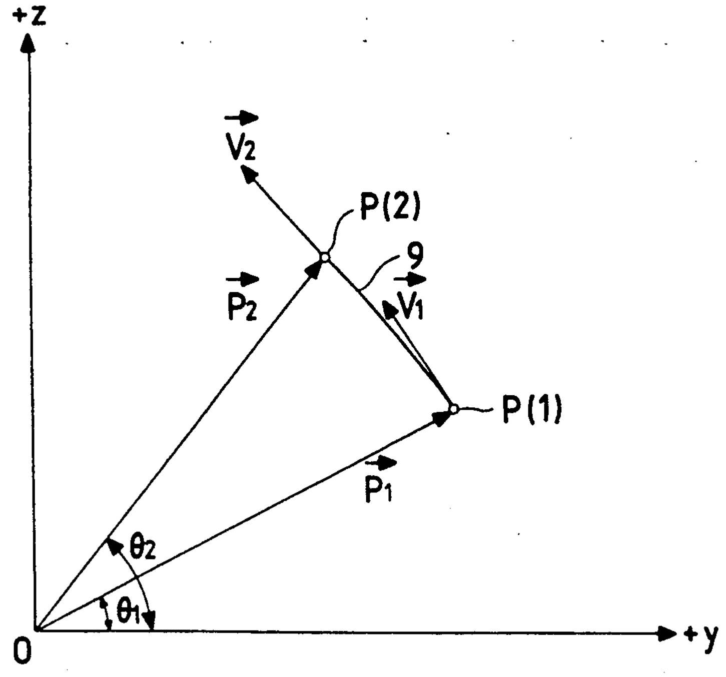
FIG. 11 is a y-z diagram showing a cross sectional curve when a free surface is cut by a plane perpendicular to the x-axis.

A curve 9 shown in FIG. 11 indicates a cross sectional line when a free surface is cut by a plane of $x=t_0^2/4f=x_0$ (=constant), and is expressed by a vector function $t_0\cdot\vec{f}(u)$. To simplify the calculations, it is hereunder assumed that $t_0=1$. Such a unitization is useful in cases where proportional rules are applicable. For generalization, what is required is to merely multiply the terms of $t_0=1$ by a constant.

In FIG. 11, a vector $\vec{P}_1$ is a position vector indicating a start point P(1) of the curve 9, which forms an angle $\theta_1$ with respect to the y-axis. A vector $\vec{P}_2$ is a position vector indicating an end point P(2), which forms an angle $\theta_2$ with respect to the y-axis. These position vectors can be expressed as follows:

$$\vec{P}_1=(x_0,\ \alpha_y\cos\theta_1,\ \alpha_z\sin\theta_1) \quad (7)$$
$$\vec{P}_2=(x_0,\ \alpha_y\cos\theta_2,\ \alpha_z\sin\theta_2)$$

In FIG. 11, a vector $\vec{V}_1$ is a tangential vector at the start point P(1), while a vector $\vec{V}_2$ is a tangential vector at the end point P(2).

While the curve 9 connecting the points P(1) and P(2) is expressed by an approximation $\vec{f}(u)$, it should also satisfy the following boundary conditions for the vectors $\vec{P}_1$, $\vec{P}_2$, $\vec{V}_1$ and $\vec{V}_2$:

$$\vec{f}(0)=\vec{a}_0=\vec{P}_1 \quad (8)$$
$$\left.\frac{d\vec{f}(u)}{du}\right|_{u=0}=\vec{a}_1=\vec{V}_1$$
$$\vec{f}(1)=\vec{a}_0+\vec{a}_1+\vec{a}_2+\vec{a}_3=\vec{P}_2$$
$$\left.\frac{d\vec{f}(u)}{du}\right|_{u=1}=\vec{a}_1+2\vec{a}_2+3\vec{a}_3=\vec{V}_2$$

Hence, if the four algebraic equations (a system of four simulataneous linear equations) of Formulae 8 are solved for the coefficient vectors $\vec{a}_0$ to $\vec{a}_3$, Formula 9 is obtained:

$$\begin{pmatrix}\vec{a}_3\\ \vec{a}_2\\ \vec{a}_1\\ \vec{a}_0\end{pmatrix}=\begin{bmatrix}2&-2&1&1\\-3&3&-2&-1\\0&0&1&0\\1&0&0&0\end{bmatrix}\begin{pmatrix}\vec{P}_1\\ \vec{P}_2\\ \vec{V}_1\\ \vec{V}_2\end{pmatrix} \quad (9)$$

A result of substituting Formula 9 into the function $\vec{f}_{(u)}$ produces a curve known as the Fergoson curve.

Thus, according to Formula 9, coefficient vectors $\vec{a}_0$ to $\vec{a}_3$ can be calculated when the start and end points and the tangential vectors at these points are given, and by substituting the thus calculated vectors into Formula 4 or Formula 6, an equation for a surface in a region defined by the start and end points can be calculated.

Next, a description will be made as to how the tangential vectors $\vec{V}_1$, $\vec{V}_2$ at the terminal points are given.

It is apparent that if tangential vectors $\vec{V}_1$, $\vec{V}_2$ are given as tangential vectors of an ellipse as shown in Formula 3, a part of an elliptical paraboloid may be expressed by the following equation:

$$\vec{V}_1=(0,\ -\alpha_y\sin\theta_1,\ \alpha_z\cos\theta_1) \quad (10)$$
$$\vec{V}_2=(0,\ -\alpha_y\sin\theta_2,\ \alpha_z\cos\theta_2)$$

That is, Formulae 10 can be obtained by differentiating the position vectors $\vec{P}_1$, $\vec{P}_2$ in Formula 7 once with respect to the parameters $\theta_1$, $\theta_2$, respectively, and it is apparent that the points P(1), P(2) are points on an ellipse. The equation is just an approximation of the line between the points P(1) and P(2).

Figure 12A:
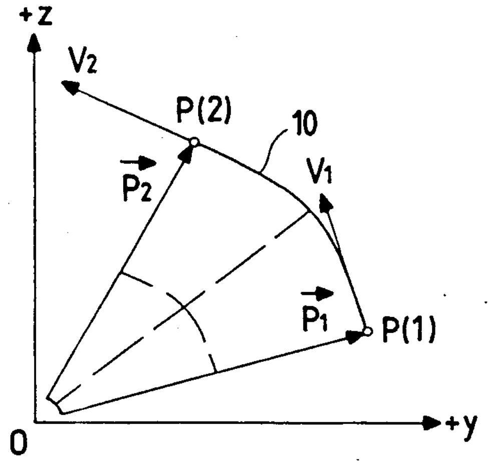
FIG. 12(*a*) is a y-z diagram showing the configuration of the free surface, and FIG. 12(*b*) is an x-z diagram showing the configuration of the free surface.
Figure 12B:
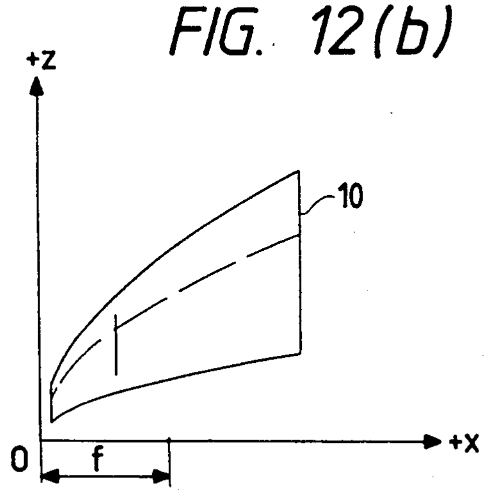

Depending on how the tangential vectors are given, the curve connecting the two points (P(1) and P(2)) can be controlled in terms of vector, thereby providing a new freedom. That is, as shown in a y-z diagram of FIG. 12(*a*), a curve 10 connecting a start point P(1) specified by a position vector $\vec{P}_1$ and an end point P(2) specified by a position vector $\vec{P}_2$ can be selected freely by how tangential vectors $\vec{V}_1$, $\vec{V}_2$ are given at the start and end points. An x-z diagram of FIG. 12(*b*) shows a configuration when the free surface is viewed from the y-axis, which is a collection of parabolas as in the case of FIG. 10(*b*).

Figure 13:
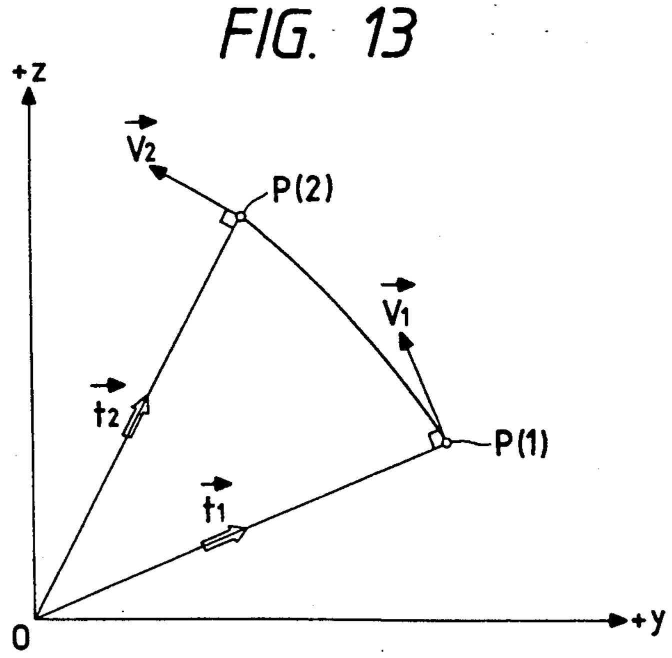
FIG. 13 is a y-z diagram illustrating a restriction on a tangential vector.

It is understood from the above discussion tl.at a free curve deviating from an ellipse can be obtained depending on how the tangential vectors are given. Such a case is interesting from the viewpoint of geometrical optics that the tangential vectors are restricted to be orthogonal to the respective position vectors. Under such conditions, as shown in FIG. 13, a direction vector $\vec{t}_1$ directing toward a start point P(1) from the origin O is orthogonal to a tangential vector $\vec{V}_1$ at the start point P(1), and a direction vector $\vec{t}_2$ directing toward an end point P(2) from the origin O is orthogonal to a tangential vector $\vec{V}_2$ at the end point P(2). Accordingly, the tangential vectors $\vec{V}_1$, $\vec{V}_2$ are expressed as:

$$\vec{V_1} = (0, -a_z\sin\theta_1, a_y\cos\theta_1) \qquad (11)$$
$$\vec{V_2} = (0, -a_z\sin\theta_2, a_y\cos\theta_2)$$

The satisfaction of the above orthogonal conditions can easily be verified by the fact that inner products ($\vec{P}_1$, $\vec{V}_1$) and ($\vec{P}_2$, $\vec{V}_2$) between the position vectors $\vec{P}_1$, $\vec{P}_2$ of Formula 7 and the tangential vectors $\vec{V}_1$, $\vec{V}_2$ of Formulae 11 are equal to zero, respectively.

Figure 14:
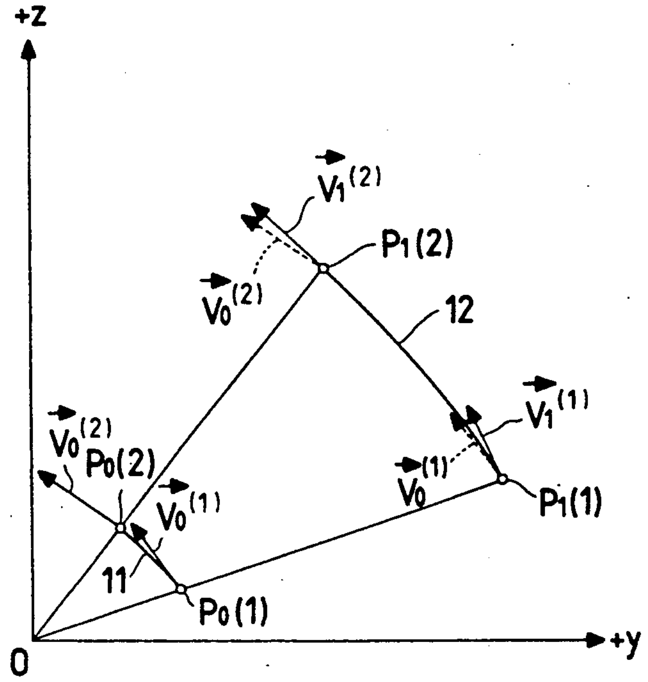
FIG. 14 is a y-z diagram illustrating the twisting of a surface.

An interesting geometric surface operation in connection with the filament image movement is to give a twist to a surface. As shown i a y-z diagram of FIG. 14, let us assume a case where an intersecting line 11, when a free surface is cut by a plane of $x = t_0^2/4f$, is expressed by the following equation using a vector function $\vec{f}_0$ which is defined by a tangential vector $\vec{V}_0^{(1)}$ at a start point $P_0$(1) and a tangential vector $\vec{V}_0^{(2)}$ at an end point $P_0$(2)

$$\vec{F_0} = \frac{t_0^2}{4f}\cdot\vec{i} + t_0\cdot\vec{f_0} \qquad (12)$$

and an intersecting line 12, when the free surface is cut by a plane of $x = t_0^2/4f$ $(t_1 > t_0)$, is expressed by $$\vec{F_1} = \frac{t_1^2}{4f}\cdot\vec{i} + t_1\cdot\vec{f_1} \qquad (13)$$

using a vector function $\vec{f}_1$ which is defined by a tangential vector $\vec{V}_1^{(1)}$ at a start point $P_1$(1) and a tangential vector $V_1^{(2)}$ at an end point $P_1$(2).

It should be kept in mind here that the tangential vectors $\vec{V}_1^{(1)}$, $\vec{V}_1^{(2)}$ at the start and end points $P_1$(1), $P_1$(2) of the intersection line 12 are obtained by twisting applicable vectors by certain angles around the start and end points $P_1$(1), $P_1$(2). Such vectors (indicated by the dotted lines in FIG. 14) are obtained by translating the tangential vectors $\vec{V}_0^{(1)}$, $\vec{V}_0^{(2)}$ at the start and end points $P_0$(1), $P_0$(2) of the intersecting line 11, respectively. As a result, the surface formed by the curve connecting the start points and the curve connecting the end points is twisted, and the intersecting lines 11, 12 are twisted, with respect to the original surface (i.e., a surface to be obtained if it is assumed that the tangential vectors at the start and end points of the intersecting line 12 are equal to $\vec{V}_0^{(1)}$, $\vec{V}_0^{(2)}$, respectively).

The vector algebraic expression of the twisted surface can be expressed in the form of a linear combination of $\vec{f}_0$ and $\vec{f}_1$ as shown below:

$$\vec{F} = \frac{t^2}{4f}\cdot\vec{i} + t\cdot\left[\frac{t_1 - t}{t_1 - t_0}\cdot\vec{f_0} + \frac{t - t_0}{t_1 - t_0}\cdot\vec{f_1}\right] \qquad (14)$$

provided that $t_0 \leqq t \leqq t_1$

The above equation represents a surface which becomes the curve 11 defined by Formula 12 when $t = t_0$, and the curve 12 defined by Formula 13 when $t = t_1$.

While the vector functions $\vec{f}_0$ and $\vec{f}_1$ are linearly combined in Formula 14, in general the vector functions $\vec{f}_0$, $\vec{f}_1$ may be combined into a vector function $\vec{F}$, shown in the following formula using scalar functions g(t) and g'(t):

$$\vec{F} = \frac{t^2}{4f}\cdot\vec{i} + t\cdot[g(t)\cdot\vec{f_0} + g'(t)\cdot\vec{f_1}] \qquad (15)$$

It is noted that the functions g(t), g'(t) should satisfy the following conditions:

$$g(t_0) = g'(t_1) = 1 \qquad (16)$$
$$g(t_1) = g'(t_0) = 0$$
$$0 \leqq |g(t)|, |g'(t)| \leqq 1$$

Figure 15A:
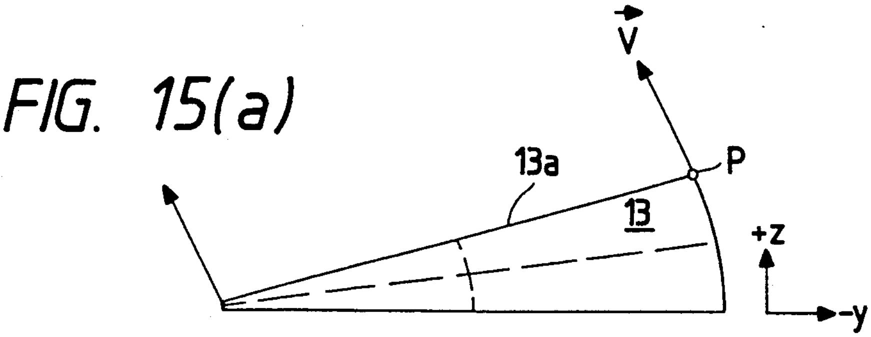
FIG. 15(*a*) is a y-z diagram showing a partial surface that has an elliptical paraboloid shape, and FIG. 15(*b*) is a diagram showing the arrangement of filament images thereby.
Figure 15B:
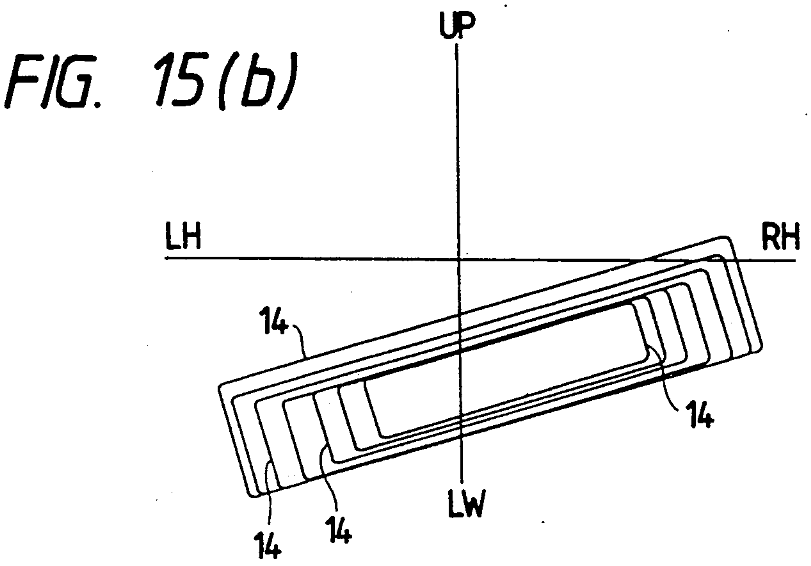

Referring to FIGS. 15–19, there will be described optical effects of the restriction of the orthogonal conditions on the tangential vectors and the twisting of a surface. FIGS. 15(*a*), 16(*a*), and 18(*a*) are diagrams schematically showing the outlook of subject surfaces when viewed from the back (i.e., from the negative side toward the positive side in the x-axis).

FIG. 15(*a*) shows a surface 13 that forms a part of an elliptical paraboloid. The restriction of the orthogonal condition is not applied to a tangential vector $\vec{V}$ at a terminal point P.

FIG. 15(*b*) shows an arrangement of filament images 14 to be projected on a distant screen by representative points on an upper periphery 13*a* of the surface 13, which was obtained by a computer simulation. In this case, it is assumed that a filament is cylindrical and its central axis extends in the optical axis of the surface 13, and its rear end is located adjacent to the focal point of the surface 13. Thus, modeling is made such that the filament images become rectangular. In FIG. 15(*b*), "UP-LW" designates a relative vertical line substantially passing through the center of the respective filament images, while "LH-RH" designates a relative horizontal line orthogonal to the line UP-LW.

It is understood from FIG. 15(*b*) that the longitudinal central axes of the respective filament images 14, 14, . . . do not necessarily coincide with one another.

Figure 16A:
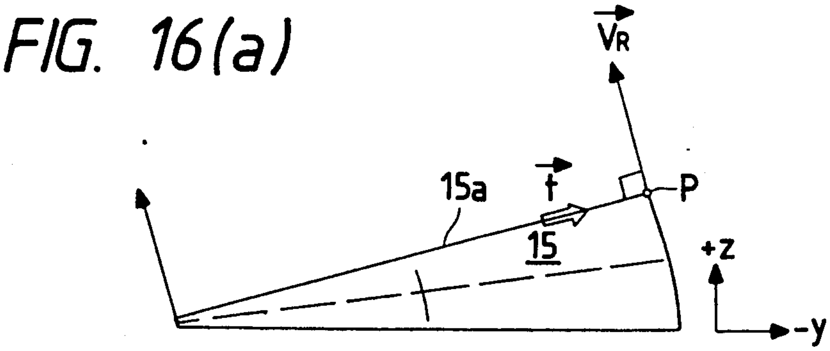
FIG. 16(*a*) is a y-z diagram showing a partial surface of a free surface in which a tangential vector is restricted, and FIG. 16(*b*) is a diagram showing the arrangement of filament images thereby.
Figure 16B:
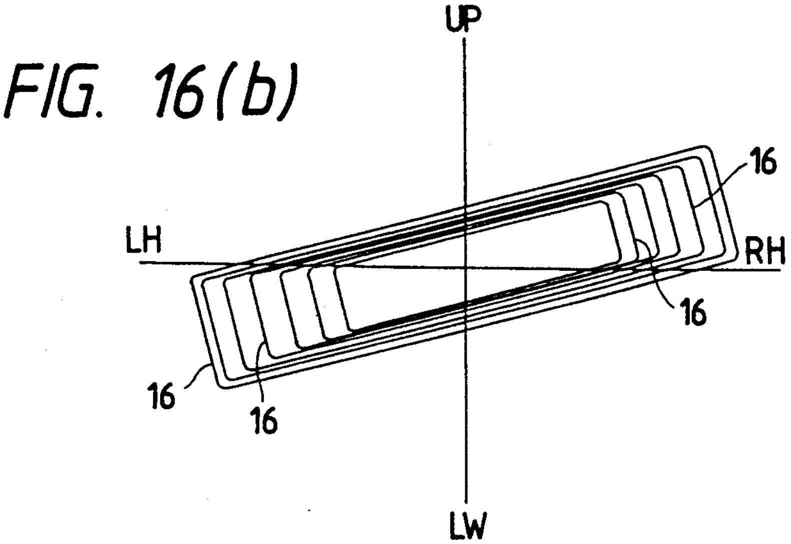

A surface 15 shown in FIG. 16(*a*) is a surface that is obtained by subjecting the surface 13 of FIG. 15(*a*) to a restriction on the tangential vector $\vec{V}$ at the terminal point P. A direction vector $\vec{t}$ of an upper periphery 15*a* of the surface is orthogonal to a tangential vector $\vec{V}_R$.

Figure 17:
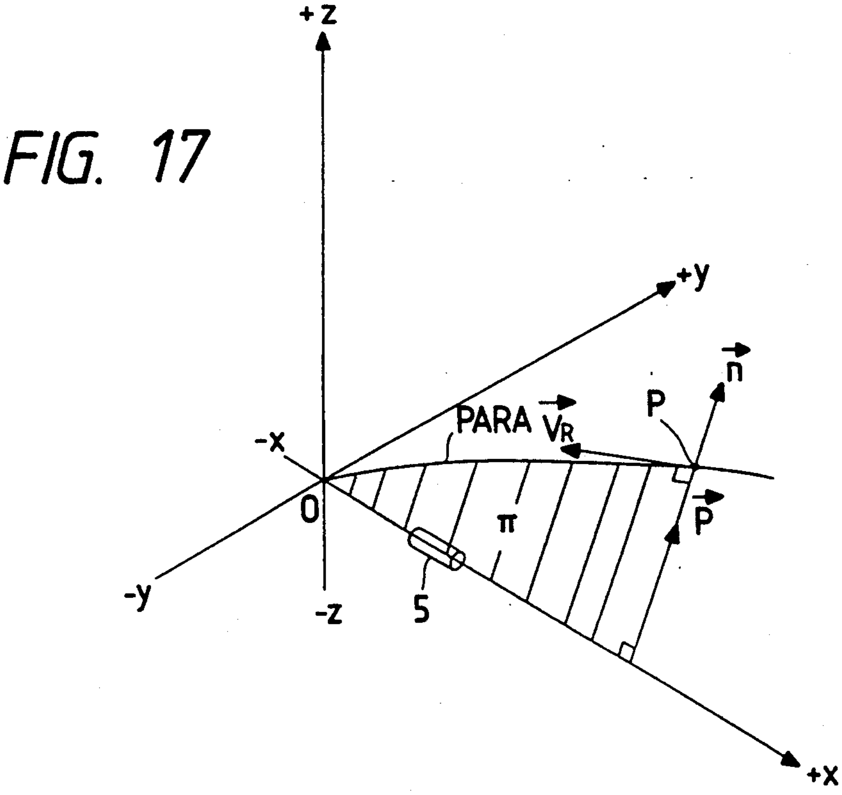
FIG. 17 is a diagram illustrating an optical effect obtained when the tangential vectors are restricted by an orthogonal condition.

FIG. 16(*b*) shows the arrangement of filament images to be projected on the distant screen by some representative points on the upper periphery 15*a* of the surface 15. It is apparent that all the longitudinal central axes of the respective filament images 16, 16, . . . are completely coincident with one another. The reason why the restriction of the orthogonal condition brings about such an optical effect is that, as shown in FIG. 17, since a position vector $\vec{P}$ pointing a terminal point P is orthogonal to the tangential vector $\vec{V}_R$, a normal vector $\vec{n}$ at an arbitrary point on a parabola PARA, which is associated with the upper periphery 15*a*, is included in a plane $\pi$ that is defined by the optical axis (x-axis) and the parabola PARA. Therefore, the light beams that are assumed to have been irradiated from the central axis of the filament 5 positioned in the optical axis and adjacent to the focal point are made incident on arbitrary points on the parabola PARA along paths included in the plane $\pi$, and the reflected light beams take paths also included in the same plane $\pi$, thereby causing the longitudinal central axes of the respective filament images to coincide with one another.

Figure 18A:
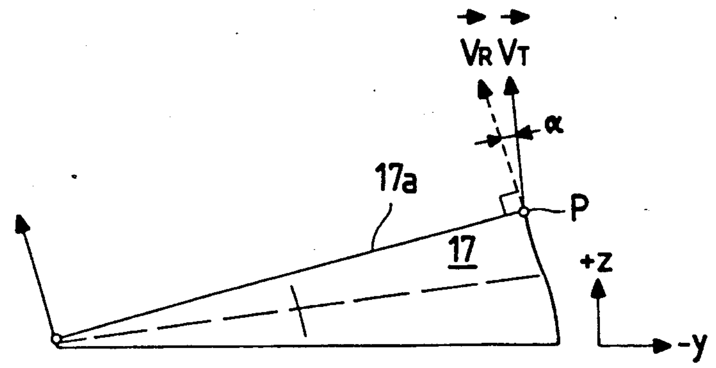
FIG. 18(*a*) is a y-z diagram showing a partial surface of a twisted free surface, and FIG. 18(*b*) is a diagram showing the arrangement of filament images thereby.
Figure 18B:
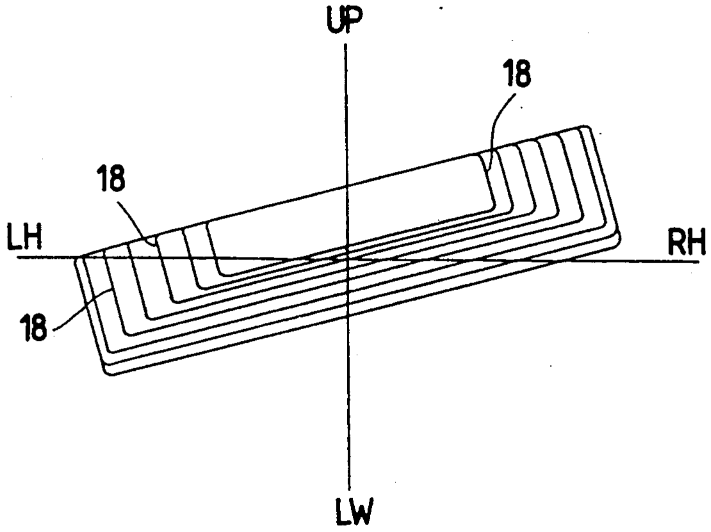

FIG. 18(*a*) shows a surface 17 obtained by twisting the restricted surface 15 of FIG. 16(*a*). A tangential vector $\vec{V}_T$ is provided at the terminal point P by rotating the tangential vector $\vec{V}_R$ (dotted line) by an angle of $\alpha$ around the terminal point P.

FIG. 18(*b*) shows the arrangement of filament images projected on the distant screen by some representative points of an upper periphery 17*a* of the surface 17. It is apparent that the longitudinally extending peripheries of the respective filament images 18, 18, . . . are completely flush with one another. This is because the twisting of the surface causes the respective filament images to move in the direction perpendicular to their longitudinal central axes. Thus, one of the peripheries of the respective filament images can be made flush with one another by adjusting the degree of twisting by specifying the tangential vector.

The operation of directing reflected light beams obliquely downward so that a pattern projected by a reflecting region forming a part of the elliptical paraboloid is located below the horizontal line H—H will be described next.

To direct the reflecting light beams forward and obliquely downward, it is sufficient to adjust the value of the configurational parameter $\alpha_z$ of the elliptical paraboloid, requiring no operation on the tangential vector.

Figure 19:
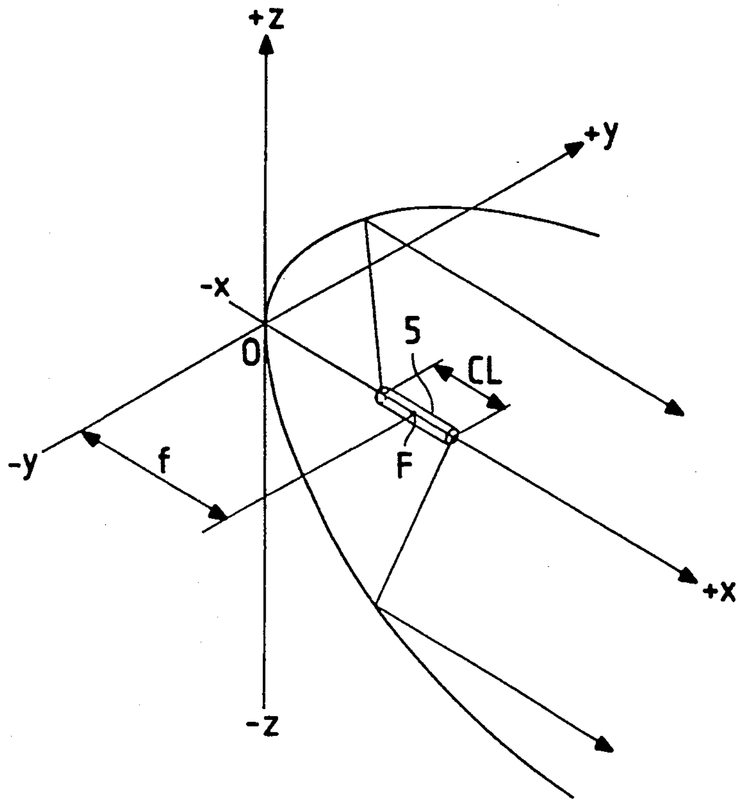
FIG. 19 is a perspective view showing the arrangement of a filament.
Figure 20:
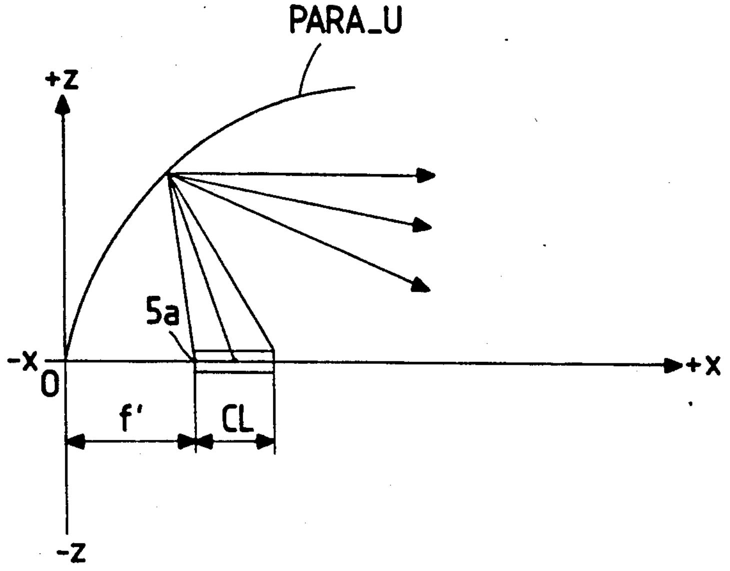
FIG. 20 is an x-z diagram illustrating conditions for directing obliquely downward reflecting light beams from an elliptical paraboloid.

That is, as shown in FIG. 19, if it is assumed that the longitudinal length of the filament 5, which extends in the x-axis direction and whose center is located on the focal point F, is "CL", then a configurational parameter $\alpha_z^2 = 1 - CL/2f$ may be given to the upper surface ($z > 0$), while the other configurational parameter $\alpha_z^2 = 1 + CL/2f$ may be given to the lower surface. This can be understood easily from the facts that in a parabola expressed by $z^2 = 4f\alpha_2 x$, light beams emitted from the focal point F (focal distance f) and then reflected at points on the parabola travel parallel to one another in the case where $\alpha_z = 1$, while they do not travel parallel to one another in the case where $\alpha_z \neq 1$ (the focal point is shifted). In the case where $\alpha_z \neq 1$the focal distance f' is $\alpha_z^2 f$, and if a rear end 5*a* of the filament 5 is assumed to coincide with the focal point of the upper surface as shown in FIG. 20, the light beams emitted from the filament 5 and reflected at the points on a parabola PARA—U on the upper side ($z > 0$) are directed downward. Therefore, the desired condition is $f' = f - CL/2$. In the case of a parabola on the lower side ($z < 0$), the similar consideration leads to the condition, $f' = f + CL/2$, where only the sign of the second term on the right side is changed.

Thus, the design procedure of respective regions of the reflecting surface 2, which is based on the arguments so far developed, includes the following steps.

(1) Reflected light beams (filament images) are collected below the cutline by adjusting the configurational parameters $\alpha_y$ and $\alpha_z$.

That is, since the low beam requires no light beams above the cutline in implementing a low beam, the filament images are arranged below the cutline by changing the configurational parameters $\alpha_y$ and $\alpha_z$. Such an operation is performed in designing the reflecting regions 2(2) and 2(3).

(2) Tangential vectors are restricted by imposing an orthogonal condition so that the longitudinal central axes of the filament images are aligned in a direction parallel to the cutline.

That is, as was described with reference to FIG. 16, this is the operation of causing the longitudinal central axes of the filament images to coincide with one another by the restriction on the tangential vectors. This is mainly applied to the reflecting regions 2(1) and 2(4) that contribute to forming a cutline.

(3) A sharp cutline is formed by flushing the longitudinally extending peripheries of the respective filament images by twisting surfaces.

That is, as was described with reference to FIG. 18, after performing step (2) a surface is twisted by rotating a tangential vector around a terminal point, to thereby flush the longitudinally extending peripheries of the respective filament images and to produce a sharp cutline. Such an operation is performed on the reflecting regions 2(1) and 2(4) that contribute to forming a cutline.

Figure 21:
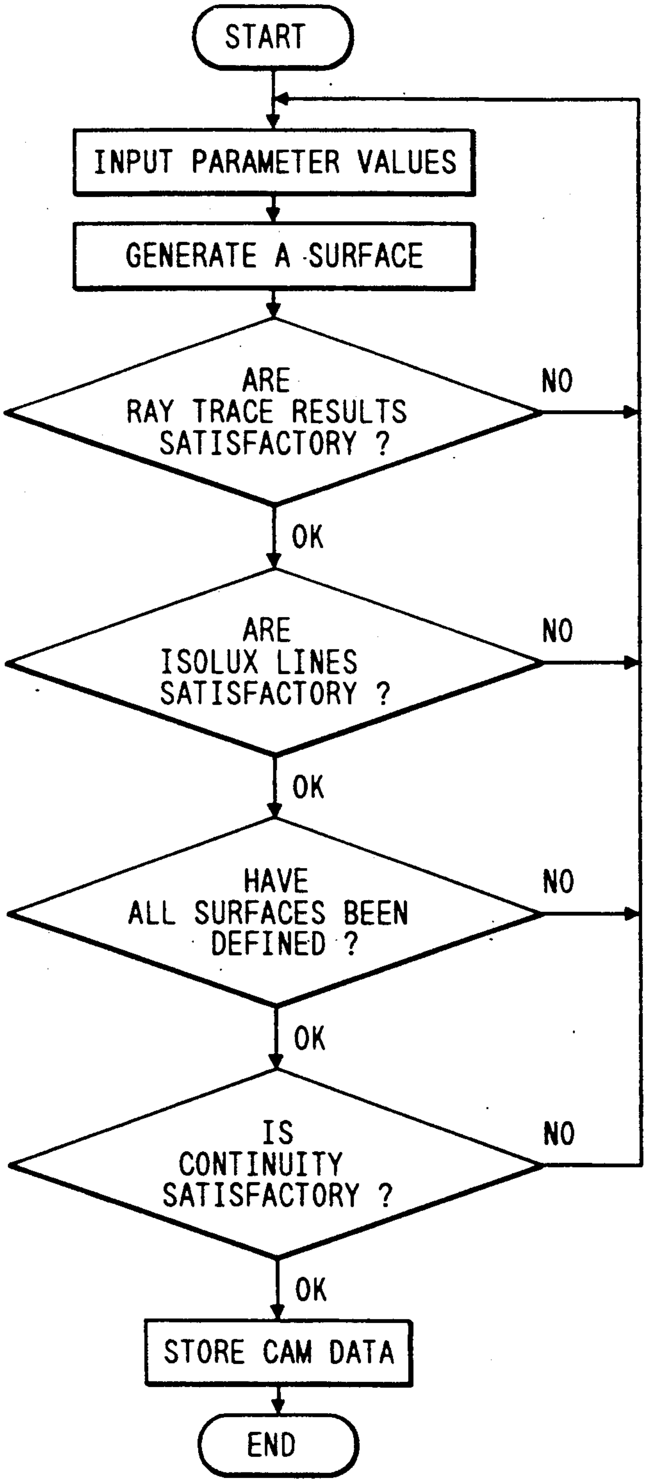
FIG. 21 is a flow chart showing a design flow.

FIG. 21 shows a flow of operations when a reflector is designed by defining surfaces of a free surface on a CAD (Computer-Aided Design) system. The above-described surface design procedure is performed in the phase of generating a surface after having input various parameter values, and then follow, in the order as written, an evaluation of the simulation results by ray trace and an evaluation of the illuminance distribution by isolux lines. If the results are not satisfactory, the system returns to the parameter value input phase and repeats the design procedure.

The above evaluations are performed for each region of the reflecting surface. After satisfactory evaluation results are obtained on the pattern of every region and surfaces are finally defined for the entire reflecting surface, continuity of the surface is checked and the final design data are used as CAM (Computer-Aided Manufacturing) data. That is, in terms of fabrication, such data are used as data for machining a mold. At this juncture, since a free surface is defined by Formula 6 and is therefore smooth along a line around the optical axis, it can be worked only by a rotating operation around the optical axis in one direction from 0° to 360°, thereby eliminating such difficulties as machining accuracy and the number of machining steps which are associated with conventional reflecting surfaces.

Figure 22:
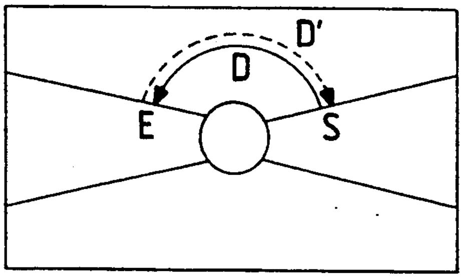
FIG. 22 is a schematic diagram illustrating problems associated with mold machining for conventional reflecting surfaces.

That is, as shown in FIG. 22, if a reflecting surface consists of a plurality of reflecting regions, and if no smooth continuity exists in the boundary of adjacent regions, it is not possible to machine a mold over 360° with the optical axis as a rotating axis to produce a desired surface, thus requiring that the surface machining be performed for each region. In addition, such processing sometimes suffers from a cumbersome operation associated with shuttling movement. That is, once a surface has been processed as shown by arrow D to reach an end position E after a start position S and the end position E of a processing region have been specified around the optical axis, no actual machining is performed during return to the start position S (dotted arrow D') and the actual machining must always be started from the start position S, to avoid accumulation of errors in machining.

Figure 23:
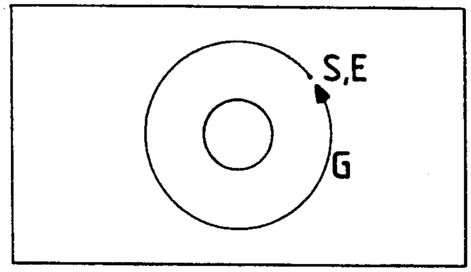
FIG. 23 is a schematic diagram illustrating mold machining in the case of the invention.

On the other hand, in the free surface of the invention, adjacent regions are connected so smoothly that there exists no visible boundary (it can be considered as a single surface whose parameters and coefficient vectors in the general equation of Formula 6 vary from one point to another on the reflecting surface). Therefore, it is possible, as shown in FIG. 23, to perform the surface machining around the optical axis from 0° to 360° in one direction as indicated by arrow G, thus allowing the processing start and end points to be selected at any position in principle.

Lastly, the luminous intensity distribution of a lamp having an experimentally fabricated reflector and an outer lens disposed in front thereof is measured. An example of a light-distribution pattern 19 (luminous intensity distribution), which satisfies the standard, is shown in FIG. 24 in the form of equicandela curves.

Figure 24:
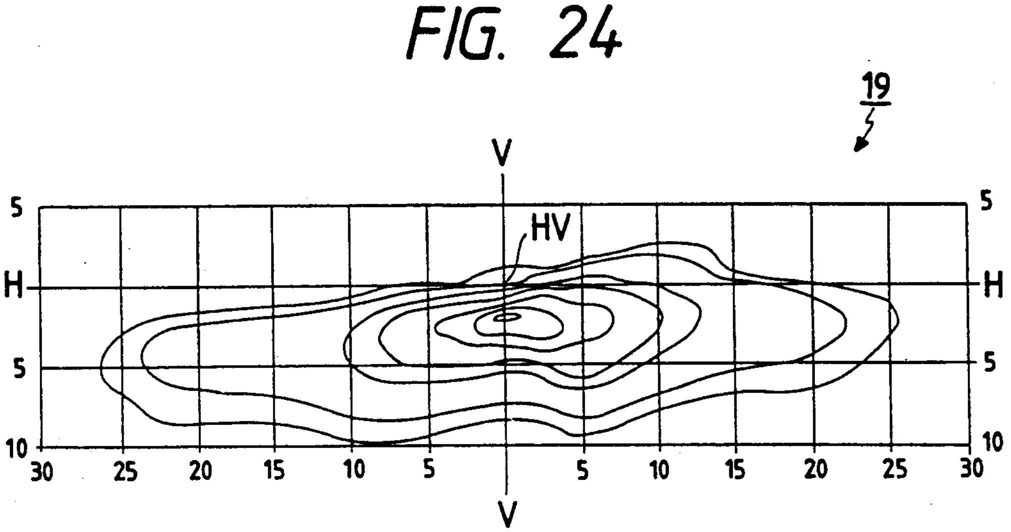
FIG. 24 is a diagram showing a light-distribution pattern of a lamp equipped with a reflector of the invention.
Figure 25:
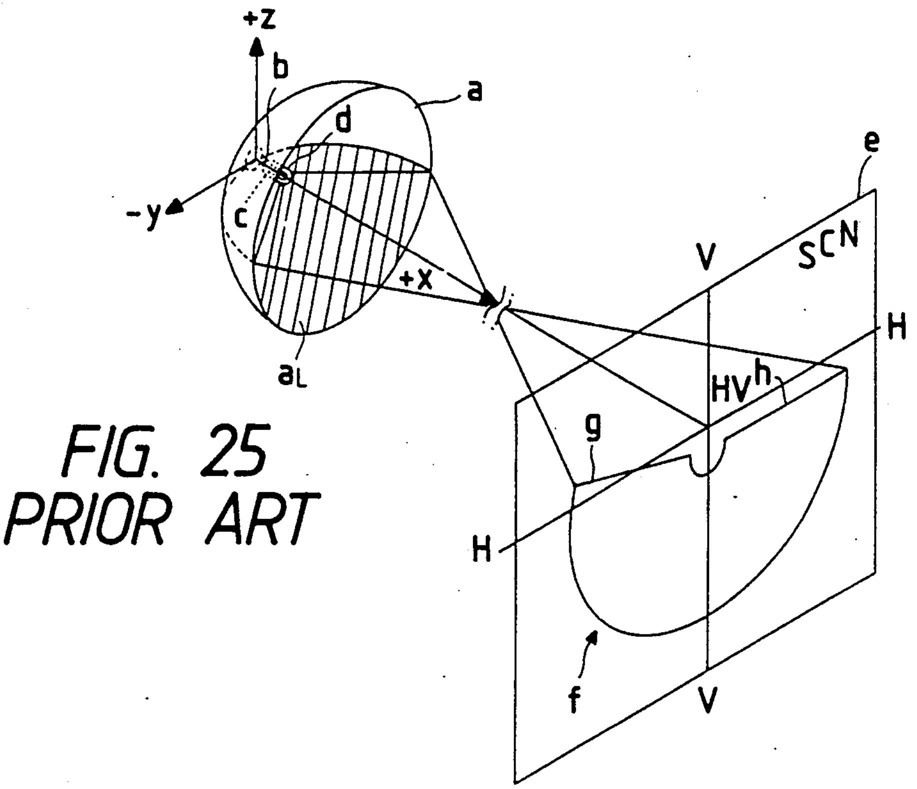
FIG. 25 PRIOR ART
FIG. 25 is a schematic perspective view showing the basic construction of a automobile headlight, together with a pattern obtained by its reflecting surface.
Figure 26A:
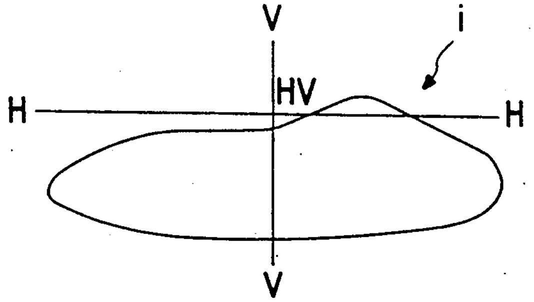
FIG. 26 a PRIOR ART
FIG. 26 is a diagram schematically showing a low beam light-distribution pattern.
Figure 27A:
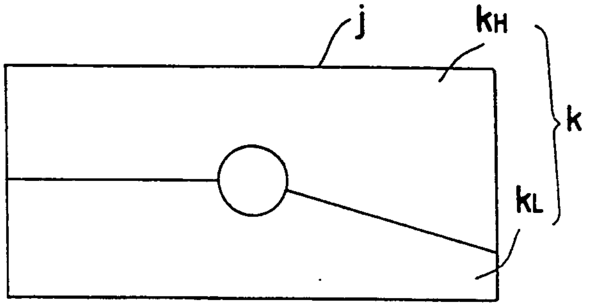
FIG. 27(a) PRIOR ART
FIG. 27(*a*) is a front view showing an exemplary conventional reflector, and FIG. 27(*b*) is a schematic diagram showing a vertical sectional view thereof.
Figure 27B:
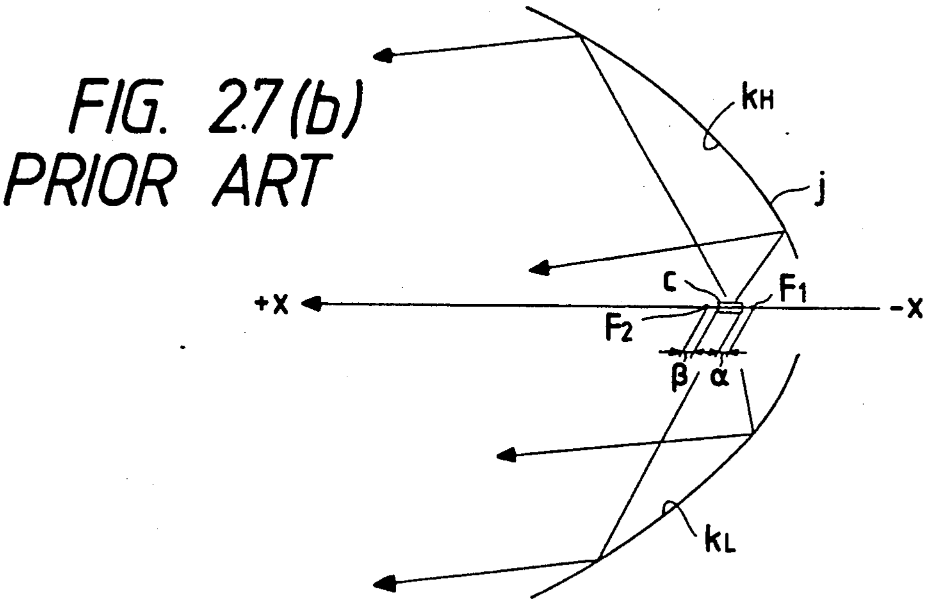
FIG. 27(b) PRIOR ART
Figure 28:
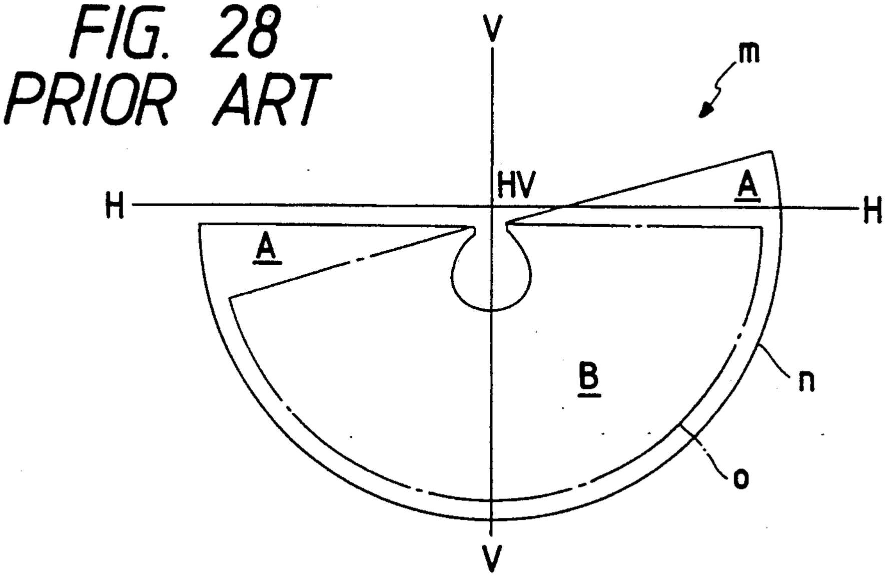
FIG. 28 PRIOR ART
FIG. 28 is a diagram showing a pattern image obtained by the reflector of FIG. 27.
Figure 29:
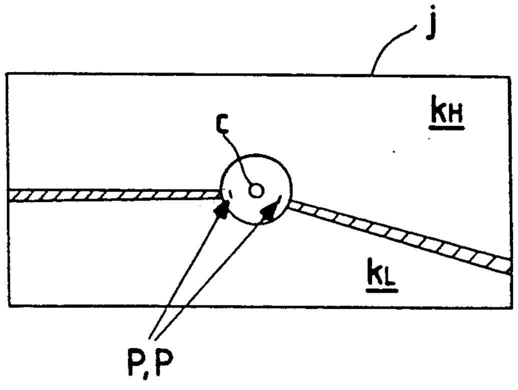
FIG. 29 is a front view of an improved version of a conventional reflector.

In FIG. 24, the scales represent angles in degrees, and the luminous intensity has a maximum of 20,000 cd at the brightest small region located below the point HV and is gradually reduced toward the peripheral taking values of 15,000, 10,000, 5,000, 3,000, 1,000 and 500 cd.

As is apparent from the foregoing description, according to the present invention, a new design freedom is created for the configuration of a surface by controlling the tangential vectors with an elliptical paraboloid employed as a basic surface, and the configuration of a reflecting surface is freely controlled by specifying the parameters, to provide a desired light-distribution control function. This allows a desired light-distribution pattern to be produced by effectively utilizing the entire reflecting surface. Therefore, even a small reflector can produce a relatively large optical output.

Further, the operations of imposing the orthogonal condition between the tangential vector at the start and end points of a cross sectional curve obtained when the reflecting surface is cut by a plane perpendicular to its optical axis and the corresponding position vector, and twisting the surface by controlling the tangential vector produce optically important effects in forming a cutline, thus contributing to forming a sharp cutline. The fact that a sharp cutline can be produced only by controlling the configuration of a surface without taking any measure such as a shade that would impair the luminous flux utilization rate is a notable feature of the reflector having the light-distribution control function.

Furthermore, the reflecting surface of the invention allows a series of works including design, evaluation, redesign and processing to be carried out on a CAD/CAM system, thus contributing to significantly enhancing development efficiency and eliminating the difficulties that have heretofore been encountered in the mold machining technology.

Although the exemplary case where the reflecting surface is divided into six light-distribution control regions has been described in the above embodiment, the technological scope of the reflector for vehicular headlights of the invention is not limited thereto. It goes without saying that there is no limitation on the number of light-distribution control regions as is apparent from the fact that the reflecting surface of the invention has no boundaries that are so clear as to be visibly discernable.

Moreover, the principles of the invention are not limited to vehicle headlight environments but may find application to any of a variety of lighting problems where the focus and directivity of a light beam is to be controlled efficiently by only the design of a reflector.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A headlight for a vehicle comprising;

a light source comprising a filament, and having a central axis defining a direction of light radiation; and a reflector comprising a plurality of reflector regions, each region being defined by a first surface having an optical axis, each said optical axis being identical with said central axis, said first surface being shaped by adjusting configurational parameters and applying vector control to produce a second surface which projects a filament image having a longitudinal central axis and a periphery along a cutline, th longitudinal central axes of all said filament images being coincident with one another.

2. The headlamp of claim 1, wherein at least one of said second surfaces is twisted whereby the respective filament images for each said at least one surfaces in moved in a direction perpendicular to its longitudinal central axis.

3. The headlamp of claim 2, wherein at least one portion of the peripheries of a plurality of said filament images are coincident along said cutline.

4. The headlamp of claim 1 wherein:

said light source filament has a longitudinal length extending along said central axis and comprises a front end an rear end thereon, and said reflector comprises an upper surface and a lower surface, each defined as an elliptical paraboloid and having respective first and second focal points, said first focal point of said upper surface substantially coinciding with said rear end of said filament and said second focal point of said lower surface substantially coinciding with said front end of said filament.

5. The headlamp of claim 4, wherein said upper surface has a configuration parameter $\alpha_z^2=1-CL/2f$ and said lower surface has a configuration parameter $\alpha_z^2=1+CL/2f$ wherein f is the focal distance and CL is the length of said filament, and said first focal point is equal to f−CL/2 and said second focal point is equal to f+CL/2.

6. A reflector for a vehicular headlight, having a light source with a central axis therethrough, and being operative to obtain a low-beam light-distribution pattern having a cut line, said reflector comprising a plurality of reflecting surfaces, each operative to project a filament image having a longitudinal central axis, at least one of said reflecting surfaces being:

(a) defined by an elliptical paraboloid as a basic surface, said elliptical paraboloid having an elliptical section when cut by a plane perpendicular to its optical axis and a parabolic section when cut by a plane including said optical axis, and said light source being arranged such that said central axis of said light source extends along said optical axis;

(b) represented by at least one sectional curve, said curve being represented by a finite-order vector algebraic expression by specifying a start position and an end position of a part of said sectional curve obtained when said reflecting surface is cut by a plane perpendicular to said optical axis, and a plurality of coefficient vectors for defining a configuration of said curve, said sectional curve being a curve deviating from a part of an ellipse which is a section of said basic surface;

(c) defined by a tangential vector at a terminal point of said at least one sectional curve, said tangential vector being orthogonal to a position vector of said terminal point so that when a filament image is projected from said reflecting surface onto a screen located in front of said reflecting surface, said longitudinal central axis of said respective filament image extends in parallel with the low beam cutline; and (d) twisted by specifying said coefficient vectors so that when said filament image is projected onto the screen located in front of said reflecting surface, at least one longitudinally extending periphery of said filament image is flush with said cutline.

7. The reflector of claim 6, wherein:

a part of the sectional curve obtained when the reflecting surface is cut by a plane perpendicular to the optical axis thereof is expressed by a third-order vector algebraic expression by specifying tangential vectors at the start position and the end position thereof; and said surface is twisted by rotating the tangential vectors at the terminal points around the terminal points, respectively.

8. The reflector of claim 6, wherein:

said plurality of reflecting surfaces are defined in accordance with paragraphs (a), (b), (c) and (d) and contribute to forming said cutline, said longitudinally extending peripheries of the respective filament images are flush with one another and the cutline is formed by the coincidence of said peripheries.

9. The reflector of claim 6, wherein said elliptical paraboloid is approximated by a vector representation of a Fergoson curve between a starting point and ending point.

10. The reflector of claim 9, wherein the tangential vector at one of said start and end points on said second surface is orthogonal to the direction vector of said surface at said point.

11. The reflector of claim 6, wherein said plurality of reflecting surfaces are smoothly connected to each other to form a continuous surface.

12. A method of producing a reflector for light emitted from a light source and operative to generate a whole pattern image with a sharply defined cutline comprising:

establishing a central axis for light from said light source;

combining a plurality of reflector regions into a reflector surface, each said region being defined by a first surface having a sectional curve with an optical axis, each optical axis being identical with said central axis; and defining a second surface from said first surface for each region by an approximation of said sectional curve, said approximation comprising configurational parameters and tangential vectors, said second surface being operative to project a filament image having a periphery along said central axis by at least adjusting said configurational parameters and applying vector control for the second surface of each region.

13. The method of claim 12, wherein said first surface is an elliptical paraboloid defining said optical axis and said second surface is represented by a finite-order vector algebraic expression.

14. The method of claim 13, further comprising calculating an equation for said second surface in each region on the basis of defined terminal points and applying tangential vectors at said points.

15. The method of claim 12, further comprising twisting said second surface, whereby a portion of a plurality of said filament images coincide.

16. The method of claim 15, wherein said twisting step comprises rotating a tangential vector disposed at one or more of said terminal points.

17. The method of claim 15, wherein said coincident filament images define a cutline at said coincident portion of said periphery and provide uniform brightness, even at said cutline.

18. The method of claim 12, further comprising checking at least the continuity of the whole pattern image.

19. The method of claim 18, further comprising storing information defining said second surface for all said regions comprising said reflector surface as CAM data.

20. The method of claim 12, further comprising shifting along said central axis the focal points for at least a top and a bottom reflector region of said reflector surface, whereby reflected light is directed obliquely downward.

* * * * *